United States Patent
Peres et al.

(10) Patent No.: US 6,274,272 B1
(45) Date of Patent: Aug. 14, 2001

(54) ACTIVE CATHODE MATERIAL FOR A LITHIUM RECHARGEABLE CELL

(75) Inventors: Jean-Paul Peres, Gif sur Yvette; Philippe Biensan, Epinay sur Orge; Andre Lecerf, Pace, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/401,332

(22) Filed: Sep. 23, 1999

(30) Foreign Application Priority Data

Oct. 1, 1998 (FR) .................................................. 98 12289

(51) Int. Cl.$^7$ .............................. H01M 4/52; C01G 53/04
(52) U.S. Cl. ........................................ 429/231.1; 423/594
(58) Field of Search ............................... 429/223, 231.1, 429/231.3; 423/593, 594, 596, 600

(56) References Cited

U.S. PATENT DOCUMENTS 6,077,496 * 6/2000 Ito et al. .

FOREIGN PATENT DOCUMENTS

| 0 744 780 A1 | 11/1996 | (EP) . |
| 0845437-A2 | * 6/1998 | (EP) . |
| 10-241691-A2 | * 9/1998 | (JP) . |
| 11-040154-A2 | * 2/1999 | (JP) . |

* cited by examiner

Primary Examiner—Stephen Kalafut
Assistant Examiner—Susy Tsang
(74) Attorney, Agent, or Firm—Sughrue, Mion, Zinn, Macpeak & Seas, PLLC

(57) ABSTRACT

An active cathode material for a lithium rechargeable cell is in the form of lithium-containing nickel oxide substituted by three elements including at least cobalt and aluminum. The material has a monoclinic crystal structure and the following general formula:

$$Li_L Ni_{(1-C-A-M)} Co_C Al_A Mg_M O_2$$

where:
 $0.05 \leq L \leq 1.03$
 $0.05 \leq C \leq 0.20$
 $0.11 \leq A \leq 0.20$
 $0.01 \leq M \leq 0.05$
 and $C/A \geq 0.60$

11 Claims, 3 Drawing Sheets

ACTIVE CATHODE MATERIAL FOR A LITHIUM RECHARGEABLE CELL

BACKGROUND OF THE INVENTION

1. Field of the Invention

The present invention concerns an active cathode material for a lithium rechargeable cell. It also concerns a method of manufacturing the active material. It also encompasses the positive electrode and the cell containing it.

2. Description of the Prior Art

Lithium-containing oxides of transition metals have been used as active cathode materials in lithium cells, in particular $LiNiO_2$ and $LiCoO_2$. Cobalt is a costly metal and its procurement can give rise to problems. It is therefore preferable to concentrate on improving the characteristics of the active cathode material $LiNiO_2$.

On the one hand, the active material $LiNiO_2$ is highly unstable thermally, which represents a high risk to the safety of the user. Document EP-0 782 206 proposes one solution to the problem of stabilizing this active material and describes an active cathode material based on $LiNiO_2$ substituted by Al and possibly Co and/or Mn. This material has a low capacity, however.

On the other hand, the active material $LiNiO_2$ offers insufficient performance, especially in terms of fast discharge or discharge at high temperature. Document EP-0 744 780 proposes substituting $LiNiO_2$ to obtain a material whose initial capacity is in the same order of magnitude as that of $LiNiO_2$ but with improved performance in terms of fast discharge and discharge at high temperature. The fast cycling characteristics are improved by substituting some of the nickel by Mg, Ca, Sr or Ba and by substituting less than 10% of the Ni by Al or Cr. Improvements are also observed with a combination of Al, Mg, B and Co. However, the material has insufficient thermal stability to assure the safety of the user.

An aim of the present invention is to propose an active cathode material obtained by substituting some of the nickel of $LiNiO_2$, having both a high initial capacity and good cycling stability, and which guarantees the safety of the user.

SUMMARY OF THE INVENTION

The present invention consists in an active cathode material for a lithium rechargeable cell which is in the form of lithium-containing nickel oxide substituted by three elements including at least cobalt and aluminum, wherein the material has a monoclinic crystal structure and the following general formula:

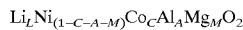

where:

$0.05 \leq L \leq 1.03$
$0.05 \leq C \leq 0.20$
$0.11 \leq A \leq 0.20$
$0.01 \leq M \leq 0.05$
and $C/A \geq 0.60$ In a preferred embodiment of the present invention the active material has a general formula in which $A=0.14\pm0.03$ and $C=0.15\pm0.05$.

The X ray diffraction diagram of the active material was obtained under the following conditions:

tube voltage: 40 kV
tube current: 30 mA
scanning speed: 0.15 degrees/min
copper $K\alpha_1$ line: 0.154056 nm The ratio of the intensities of the [003] and [104] lines of the X ray diffraction diagram of the active material is preferably at least equal to 1.45. For ratios lower than this the active material has a lower capacity. The ratio is even more preferably at least equal to 2.0.

The crystal structure of the active material of the invention is deformed by the substitution and differs from the $LiNiO_2$ structure specified by Joint Committee on Powder Diffraction reference JCPDS 9-0063. For example, for an active material of the invention of formula $Li_{1.00}$ $Ni_{0.72}$ $Co_{0.10}$ $Al_{0.15}$ $Mg_{0.03}$ $O_2$, the monoclinic structure has the following lattice parameters a=0.496 nm, b=0.286 nm, c=0.502 nm and $\beta=109.28°$.

The present invention also consists in a method of manufacturing the previously defined active cathode material comprising a heat treatment step at a temperature of at least 750° C., preferably in the range from 750 to 800° C., for at least 10 hours, preferably from 15 to 25 hours, followed by slow cooling at a rate of not greater than 1° C./min and including an intermediate step at a temperature in the range from 600° C. to 700° C.

The present invention also consists in a positive electrode for a lithium rechargeable cell containing an active cathode material as previously described and further comprising a fluorinated binder and a conductive material.

The present invention further consists in a lithium rechargeable cell containing at least one negative electrode and at least one positive electrode analogous to that previously referred to in which the active anode material is a carbon-containing material into the structure of which lithium can be inserted and selected from graphite, coke, carbon black and vitreous carbon.

Other features and advantages of the present invention will become apparent in the course of the following description of embodiments which are given by way of non-limiting and illustrative example only, of course, and from the accompanying drawings.

DETAILED DESCRIPTION OF THE PREFERRED EMBODIMENTS

EXAMPLE 1

Prior art active materials $X_1$ and $Y_1$ with the following formulas were prepared:

$X_1$: Li $Ni_{0.75}$ $Co_{0.15}$ $Al_{0.10}$ $O_2$ $Y_1$: Li $Ni_{0.70}$ $Co_{0.15}$ $Al_{0.15}$ $O_2$

The active materials $X_1$ and $Y_1$ were produced in the manner described in document EP-0 782 206 from a mixture of hydroxides $\beta$-$Ni_{1-x}Co_x(OH)_2$ synthesized by co-precipitation, $Al(OH)_3$ and LiOH. The mixture was treated in the presence of oxygen for 40 hours at 720° C.

Figure 2:
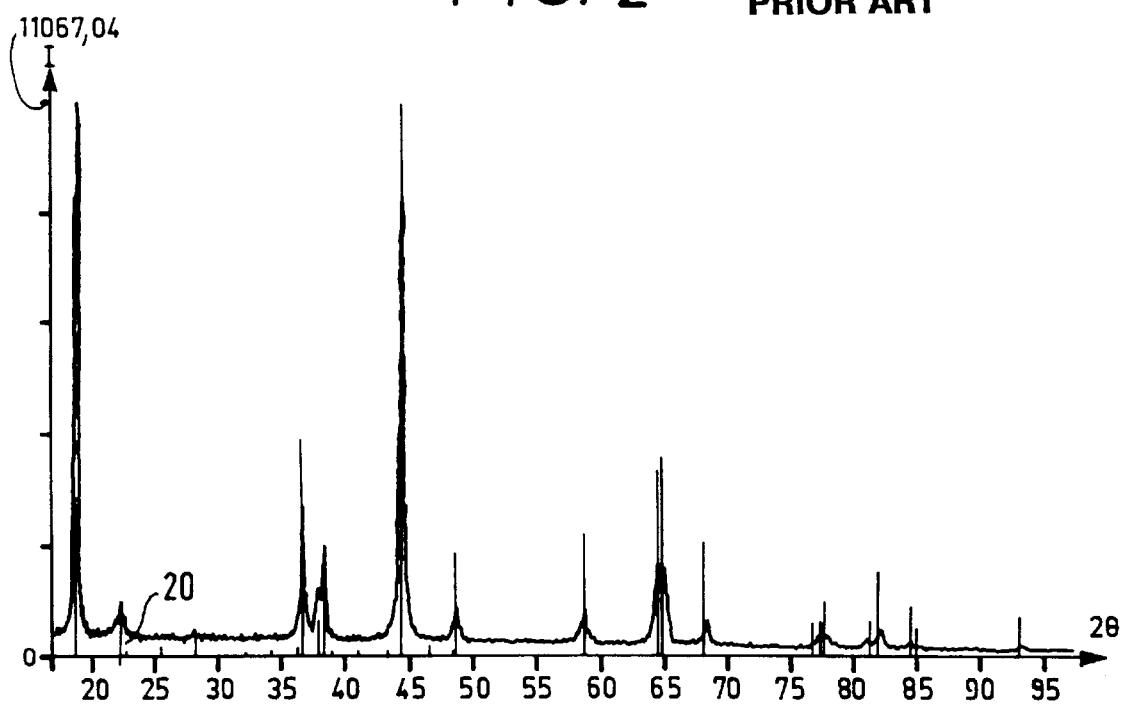
FIG. 2 is an X ray diffraction diagram for a prior art active cathode material $Li\ Ni_{0.75}\ Co_{0.15}\ Al_{0.10}\ O_2$ with the angle $2\theta$ plotted on the abscissa axis and the relative intensity I of the peaks plotted on the ordinate axis.

Synthesis of the mixed hydroxide $\beta$-$Ni_{1-x}Co_x(OH)_2$ usually employs metal salts such as sulfates which cannot be eliminated entirely and which consume lithium. If sulfates are used to make the hydroxide, the X ray diffraction diagram of sample $X_1$ (FIG. 2) shows the presence of $Li_2SO_4$ represented by an additional peak 20 at around $2\theta=22$. Also, the ratio of the intensities of the [003] line at around $2\theta=18$ and the [104] line at around $2\theta=45$ is much lower than 1.45 in the X ray diffraction diagram for sample $X_1$.

Figure 3:
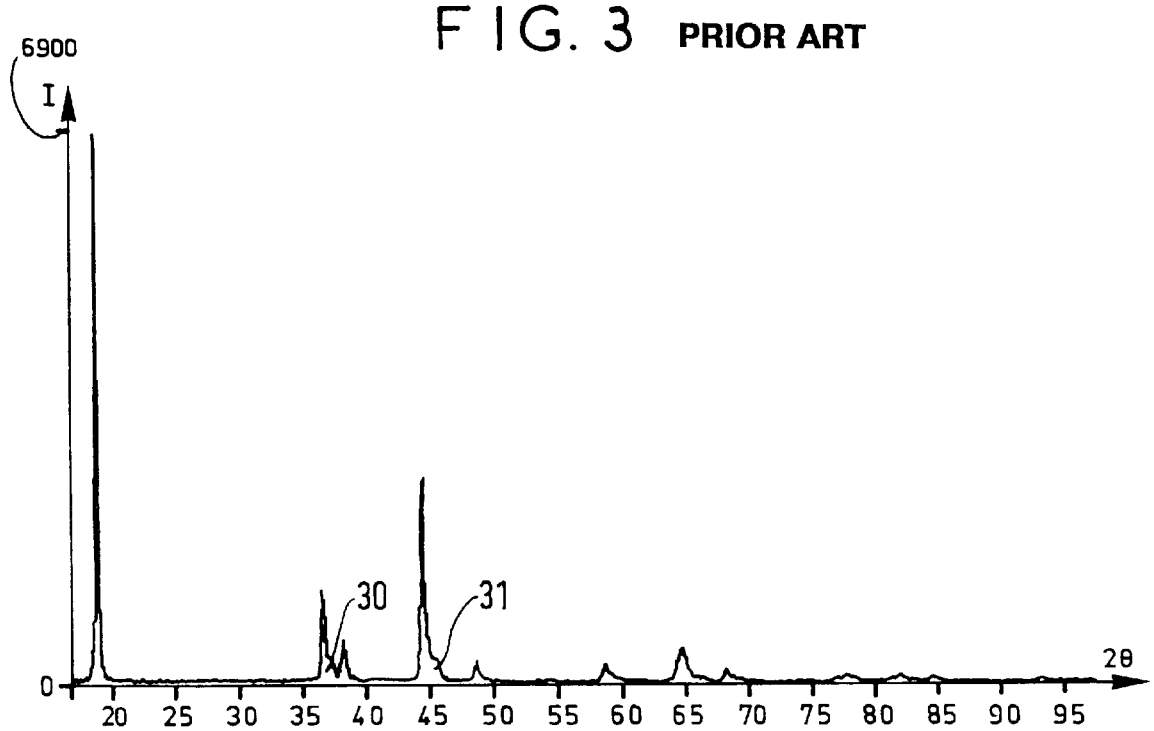
FIG. 3 is similar to FIG. 2 for a prior art active cathode material $Li\ Ni_{0.70}\ Co_{0.15}\ Al_{A0.15}\ O_2$.

In the X ray diffraction diagram for sample $Y_1$ containing more aluminum, a shoulder 30, 31 at the base of the main peaks indicated inhomogeneous distribution of the aluminum (FIG. 3).

EXAMPLE 2

A prior art active material $Z_1$ having the following formula was prepared:

$Z_1$: Li $Ni_{0.70}$ $Co_{0.09}$ $Al_{0.09}$ $Mg_{0.12}$ $O_2$

The active material $Z_1$ was made in the manner described in document EP-0 744 780 from a mixture of $Al(NO_3)_3$, $Co_3O_4$, $Mg(NO_3)_2$, $Ni(OH)_2$ and $LiNO_3$ in a ratio of Li to the other elements of 1.05. The mixture was treated in a stream of oxygen at 650° C.

Figure 4:
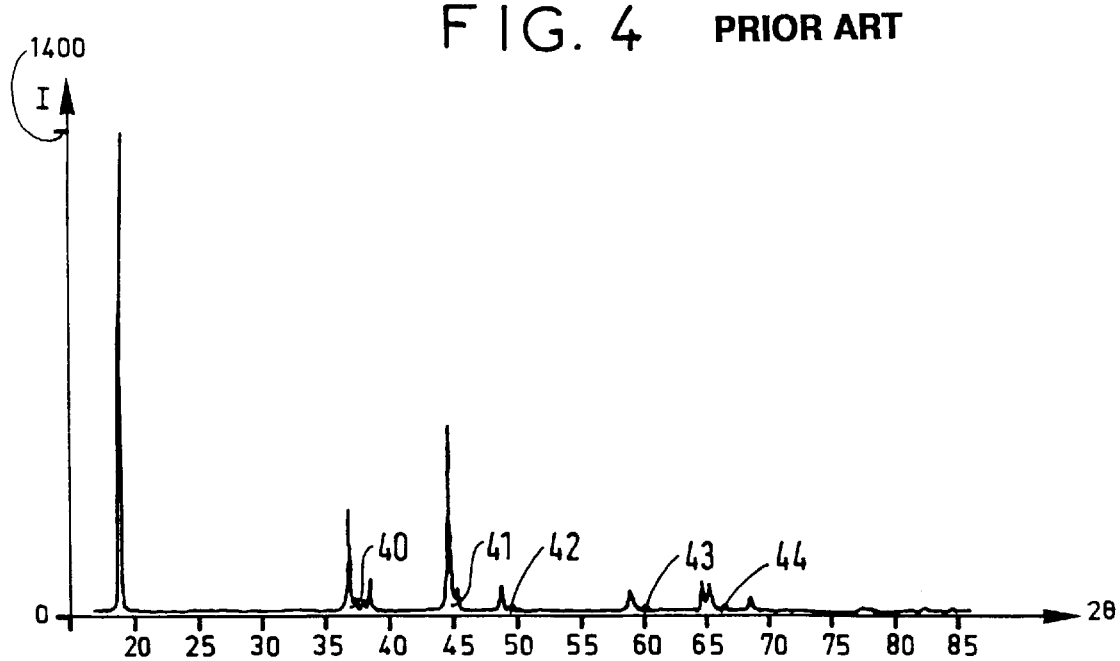
FIG. 4 is similar to FIG. 2 for a prior art active cathode material $Li\ Ni_{0.70}\ Co_{0.09}\ Al_{0.09}\ Mg_{0.12}\ O_2$.

In the X ray diffraction diagram for sample $Z_1$ (FIG. 4), duplication of the main peaks from 40 to 44 indicates inhomogeneous distribution of the aluminum and the cobalt.

EXAMPLE 3

Active materials J and K in accordance with the invention having the following formulas were prepared:

J: Li $Ni_{0.73}$ $Co_{0.10}$ $Al_{0.15}$ $Mg_{0.02}$ $O_2$

K: Li $Ni_{0.72}$ $Co_{0.10}$ $Al_{0.15}$ $Mg_{0.03}$ $O_2$

Active materials J and K were made from a stoichiometric mixture of nitrate of nickel, cobalt, aluminum and magnesium in solution in distilled water. Lithium hydroxide in solution in an ammonia solution was added to the mixture. The solvents were evaporated and the product obtained was dried in a vacuum at 120° C. for 15 hours. The dry product was then heat treated at 750° C. in the presence of oxygen for 20 hours, followed by slow cooling at 1° C./min with an intermediate period at 650° C.

Figure 5:
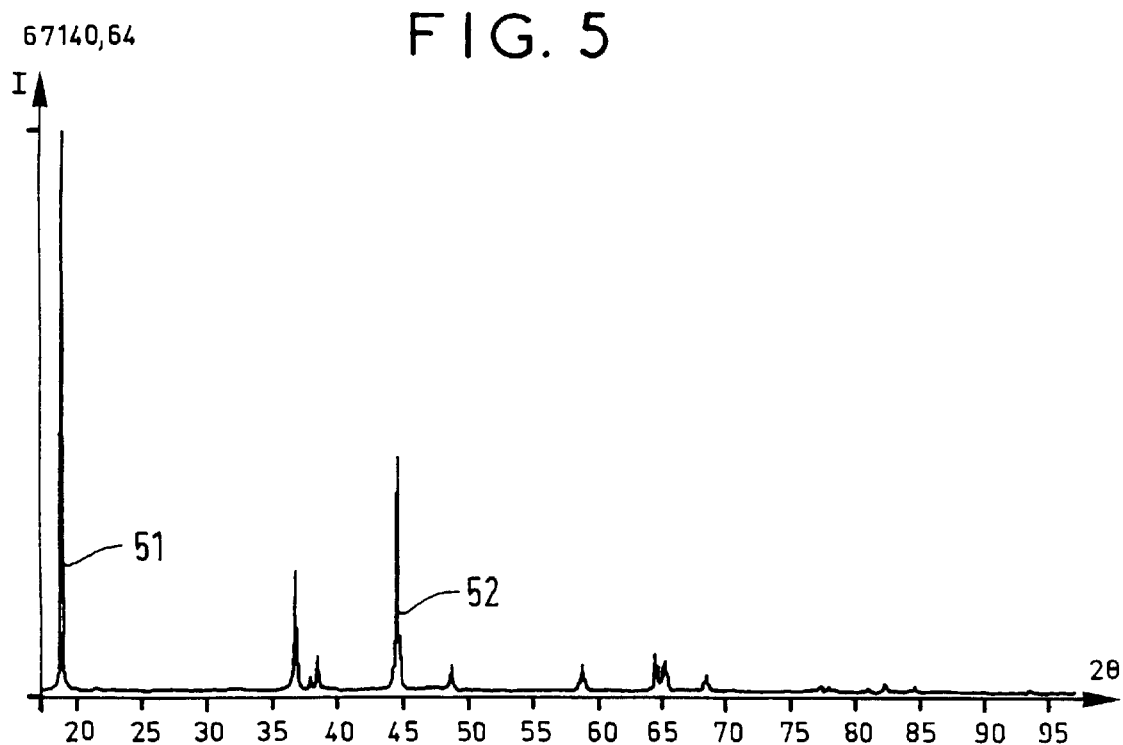
FIG. 5 is similar to FIG. 2 for an active cathode material $Li\ Ni_{0.72}\ Co_{0.10}\ Al_{0.15}\ Mg_{0.03}\ O_2$ in accordance with the invention.

FIG. 5 shows the X ray diffraction diagram for sample K. There is no sign of pollutants or of shoulders on the lines or duplication of the lines. The elements constituting the active material are homogeneously distributed. Sample K had a monoclinic structure with the following lattice parameters: a=0.496 nm, b=0.286 nm, c=0.502 nm and $\beta=109.28°$.

The ratio of the intensities of the [003] line 51 at around $2\theta=18$ and the [104] line 52 at around $2\theta=45$ is equal to 2.0 in the X ray diffraction diagram for sample K.

EXAMPLE 4

Active materials $X_2$ and $Y_2$ with the same formula as $X_1$ and $Y_1$, respectively, were prepared for purposes of comparison. The active materials $X_2$ and $Y_2$ were made in a similar way to that described for example 3, except that there was no magnesium nitrate.

EXAMPLE 5

An active material $Z_2$ with the same formula as $Z_1$ was prepared for purposes of comparison. The active material $Z_2$ was made in a similar manner to that described for example 3.

Electrochemical evaluation of each active cathode material sample necessitated the fabrication of a positive electrode. A mixture was prepared comprising 75% by weight of powdered electrochemically active material in which 95% of the particles had a size not less than 3 µm, 15% by weight of conductive material comprising carbon black and graphite and 10% by weight of a binder in the form of polytetrafluoroethylene (PTFE). A paste was produced by adding ethanol and was spread onto an inert film support. A 12 mm diameter disk cut from the film was pressed into an aluminum grid serving as a current collector and dried.

Figure 1:
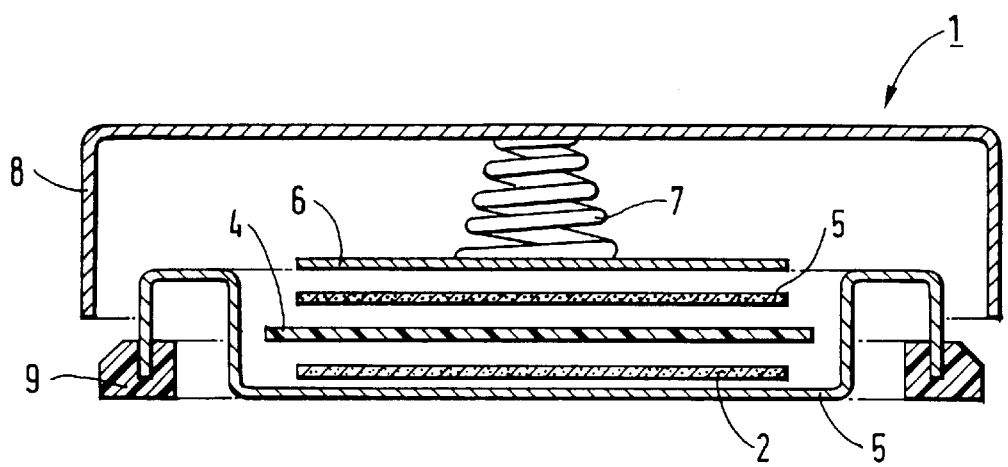
FIG. 1 is a diagrammatic exploded sectional view of a button cell whose positive electrode includes an active material in accordance with the invention.

The positive electrode obtained was used in a rechargeable lithium button cell 1 like that shown in FIG. 1. The positive electrode 2 was deposited in the cup 3 of the cell. The separator 4 comprised two films of "CELGARD 2400" microporous polypropylene with "VILEDON" polypropylene felt between them serving as an electrolyte reservoir. The negative electrode 5 was a 15 mm diameter lithium metal disk. A stainless steel spacer 6 provided a current collector and a spring 7 maintained contact between the various components of the cell 1.

The whole was impregnated with an electrolyte in the form of a solution of a lithium salt in a non-aqueous solvent. The non-aqueous solvent contained 20% by weight propylene carbonate (PC), 20% by weight ethylene carbonate (EC) and 60% by weight dimethyl carbonate (DMC) in which lithium hexafluorophosphate $LiPF_6$ was dissolved to a concentration of 1 M. After introducing the electrolyte, the cell 1 was closed and sealed by a cover 8 and a seal 9.

After two charge/discharge cycles at ambient temperature, the thermal stability of the active material was evaluated by the differential scanning calorimetry (DSC) test which determines the variation of thermal flux in a sample subjected to a temperature program. When a material is heated or cooled, its structure changes and the transformations involve exchange of heat. DSC analysis provides information on the transformation temperature (endothermic or exothermic peak) and on the thermal energy required for the transformation (area of the peak).

In the present instance, these measurements were used to evaluate the thermal stability of the active material. Cycling was first carried out at ambient temperature (20° C.), as follows:

charge at 0.05 Ic to a voltage of 4.1 V, discharge at 0.05 Ic to a voltage of 3 V, charge at 0.05 Ic to a voltage of 4.1 V.

Additional charging was then carried out to a voltage equal to Vr which is the maximum voltage measured relative to the lithium from which the reactions that occur become violent. A 3 mg sample of active material in the charged state was then taken from a positive electrode impregnated with electrolyte. The active material sample was heated from 20° C. to 500° C. at a rate of 10° C./min in an argon atmosphere.

The electrochemical cycling test at ambient temperature (20° C.) was carried out under the following conditions, where Ic is the theoretical current needed to discharge the nominal capacity of a cell in one hour:

charge at 0.05 Ic to a voltage of 4.1 V, discharge at 0.05 Ic to a voltage of 3 V.

The capacity Cc charged in the first cycle and the capacity Cd discharged in the second cycle at ambient temperature were measured.

The reversible capacity at high temperature was measured under the following conditions. Two cycles were first carried out at ambient temperature (20° C.) under the above conditions, after which two cycles were carried out at 60° C. under the following conditions:

charge at 0.1 Ic to a voltage of 4.1 V, discharge at 0.2 Ic to a voltage of 3 V.

The capacity Cd discharged in the second cycle at high temperature was measured.

The results of the evaluation are set out in the table below.

In the results of the DSC analysis, Vr is the maximum voltage measured relative to the lithium from which the reactions which occur become violent and Tp is the temperature in ° C. at which a violent reaction occurs when the active material has been charged to a voltage of 4.2 V. Tp represents the limit of thermal stability of the material.

In the cycling results, Cc is the capacity in mAh/g charged in the first cycle, Cd is the capacity in mAh/g discharged in the second cycle and P is the loss of capacity in % per cycle in 24 cycles at 60° C.

TABLE

|  | Vr | Tp | Cc at 20° C. | Cd at 20° C. | Cd at 60° C. | P |
|---|---|---|---|---|---|---|
| $X_1$ | 4.2 | 250 | 150 | 110 | 130 | 0.61 |
| $Y_1$ | 4.2 | 260 | 145 | 105 | 130 | 0.58 |
| $Z_1$ | 4.1 | 260 | — | — | — | — |
| J | >4.5 | 300 | 172 | 127 | 135 | 0.12 |
| K | >4.5 | 300 | 170 | 127 | 140 | 0.04 |
| $X_2$ | >4.5 | 280 | 175 | 130 | 140 | 0.30 |
| $Y_2$ | >4.5 | 290 | 175 | 135 | 145 | 0.20 |
| $Z_2$ | 4.3 | 290 | — | — | — | — |

The results of the DSC test showed that the prior art samples $X_1$, $Y_1$ and $Z_1$ had insufficient thermal stability. Also, for sample $Z_1$ the reactions were violent at a voltage that might be reached in use.

Samples $X_2$ and $Y_2$ obtained by the method in accordance with the present invention gave acceptable results in the DSC test. Sample $Z_2$ still exhibited unsatisfactory behavior from the safety point of view.

The electrochemical evaluation showed that samples J and K in accordance with the invention hod both a higher capacity and improved stability on cycling compared to the prior art samples $X_1$ and $Y_1$. The samples $X_2$ and $Y_2$ obtained by the method in accordance with the present invention had improved stability but their stability on cycling was not so good as samples J and K in accordance with the invention.

Figure 6:
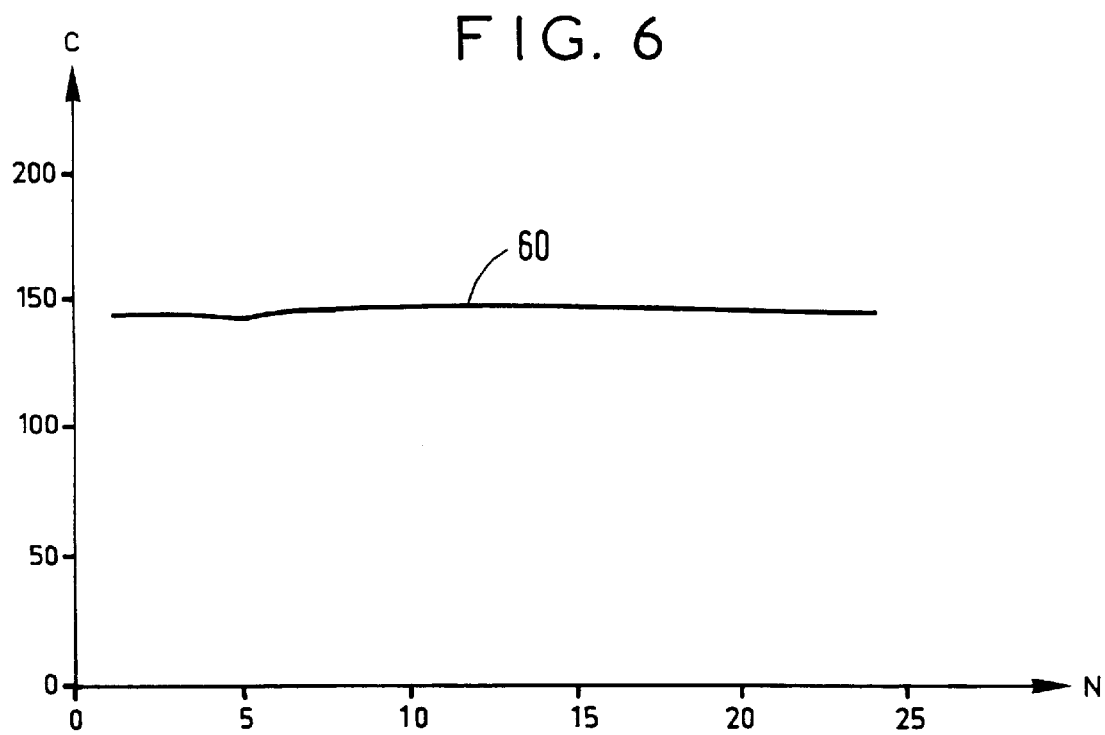
FIG. 6 shows the evolution of the discharge capacity C in mAh/g as a function of the number N of cycles during cycling at 60° C. of an active cathode material $Li\ Ni_{0.72}\ Co_{0.10}\ Al_{0.15}\ Mg_{0.03}\ O_2$ in accordance with the invention.

The exceptional stability of the capacity of sample K, even at 60° C., can be seen clearly in curve 60 in FIG. 6.

What is claimed is:

1. An active cathode material for a lithium rechargeable cell which is in the form of lithium-containing nickel oxide substituted by cobalt, aluminum and magnesium, wherein said material has a monoclinic crystal structure and the following general formula:

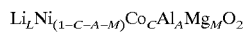

$$Li_L Ni_{(1-C-A-M)} Co_C Al_A Mg_M O_2$$

where:

$0.05 \leq L \leq 1.03$ $0.05 \leq C \leq 0.20$ $0.11 \leq A \leq 0.20$ $0.01 \leq M \leq 0.05$ and $C/A \geq 0.60$ 2. The material as claimed in claim 1 in which A=0.14±0.03 and C=0.15±0.05.

3. The material as claimed in claim 1 wherein the ratio of the intensities of the [003] line to the [104] line of the X ray diffraction diagram is at least equal to 1.45.

4. The material as claimed in claim 3 wherein said ratio is at least equal to 2.0.

5. The material as claimed in claim 1 having the general formula Li $Ni_{0.72}$ $Co_{0.10}$ $Al_{0.15}$ $Mg_{0.03}$ $O_2$ in which said monoclinic structure has the following lattice parameters: a=0.496 nm, b=0.286 nm, c=0.502 nm and β=109.28°.

6. The material as claimed in claim 1 in the form of a powder in which 95% of the particles have a size not less than 3 μm.

7. A method of manufacturing an active cathode material as claimed in claim 1 comprising a heat treatment step at a temperature of at least 750° C. for at least 10 hours followed by slow cooling at a rate of not greater than 1° C./min and said slow cooling following a temperature profile having an intermediate step at a temperature in the range from 600° C. to 700° C.

8. The method as claimed in claim 7 wherein said heat treatment is carried out a temperature in the range from 750° C. to 800° C.

9. The method as claimed in claim 7 wherein the duration of said heat treatment is in the range from 15 hours to 25 hours.

10. A positive electrode for a lithium rechargeable cell containing an active cathode material as claimed in claim 1, a fluorinated binder and a conductive material.

11. A lithium rechargeable cell containing at least one negative electrode and at least one positive electrode as claimed in claim 10, in which the active anode material is a carbon-containing material into the structure of which lithium can be inserted and selected from the group consisting of graphite, coke, carbon black and vitreous carbon.

* * * * *